Jan. 27, 1959

F. A. BAKER 2,871,441

AMPLIFIER CIRCUIT

Filed Aug. 21, 1957

INVENTOR

Floyd A. Baker

BY F. E. Browder

ATTORNEY

United States Patent Office 2,871,441

Patented Jan. 27, 1959

2,871,441

AMPLIFIER CIRCUIT

Floyd A. Baker, Inglewood, Calif., assignor to Westinghouse Electric Corporation, East Pittsburgh, Pa., a corporation of Pennsylvania Application August 21, 1957, Serial No. 679,458

7 Claims. (Cl. 323—89)

This invention relates to magnetic amplifiers in general and in particular to the control of magnetic amplifiers.

It is an object of this invention to provide an improved magnetic amplifier circuit.

It is a further object of this invention to provide an improved magnetic amplifier circuit wherein an increase in overall gain for the magnetic amplifier circuit may be obtained by decreasing the conduction angle of the control voltage to less than 180° per half-cycle.

Further objects of this invention will become apparent from the following description when taken in conjunction with the accompanying drawing. In said drawing, for illustrative purposes only, is shown a preferred form of the invention.

Figure 1:
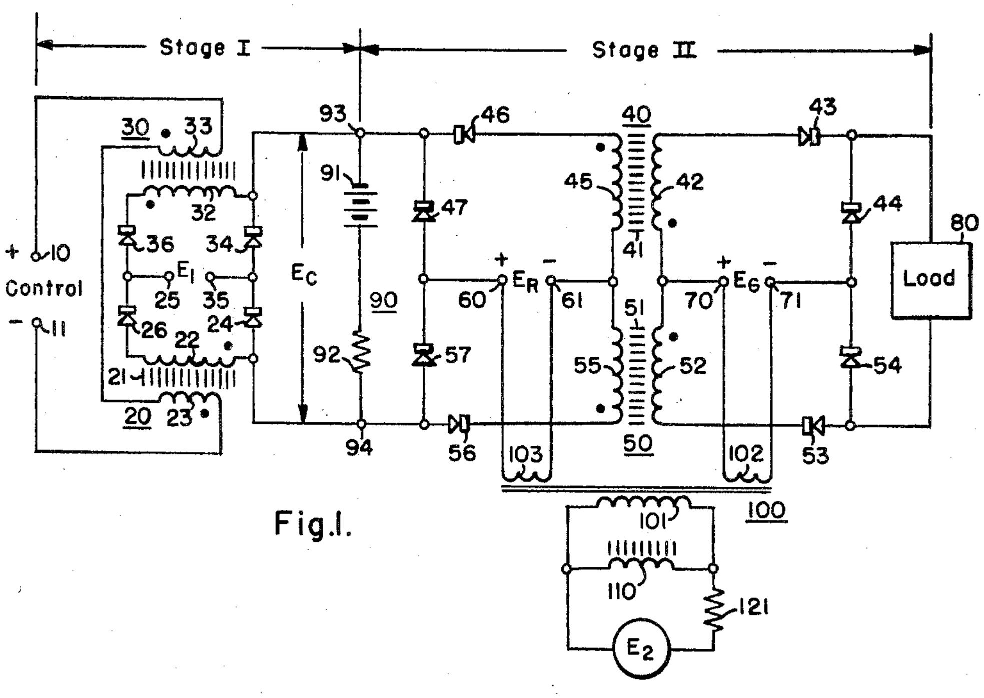
Fig. 1 is a schematic diagram of a two-stage magnetic amplifier embodying the teachings of this invention.

In Fig. 1 the polarity dot convention is used for the windings of the saturable reactors. When current is flowing into the polarity dot end of a winding the magnetic core member inductively associated with the winding is being driven toward positive saturation. When current is flowing out of the polarity dot end of a winding the magnetic core member inductively associated with the winding is being driven away from positive saturation.

Referring to Fig. 1, there is illustrated a magnetic amplifier circuit having a stage I magnetic amplifier and a stage II magnetic amplifier embodying the teachings of this invention. In general, the stage I magnetic amplifier comprises two saturable reactors 20 and 30 connected in a bridge-type arrangement with its output connected to control the stage II magnetic amplifier. The stage II magnetic amplifier comprises two saturable reactors 40 and 50 connected in a volt-second controlled bridge arrangement with its output connected to supply a load 80.

In stage I, the saturable reactor 20 comprises a magnetic core member 21 having inductively disposed thereon an output winding 22 and a control winding 23. The saturable reactor 30 comprises a magnetic core member 31 having inductively disposed thereon an output winding 32 and a control winding 33.

An alternating current voltage source $E_1$ is to be connected to a pair of terminals 25 and 35. A rectifier 26, the output winding 22 of the saturable reactor 20 and a rectifier 24 are connected in series circuit relationship between the terminals 25 and 35. A rectifier 36, the output winding 32 of the saturable reactor 30 and a rectifier 34 are connected in series circuit relationship between the terminals 25 and 35.

A control circuit for the stage I bridge-type magnetic amplifier comprises the control winding 23 of the saturable reactor 20 and the control winding 33 of the saturable reactor 30 connected in series circuit relationship between a pair of terminals 10 and 11.

In stage II the saturable reactor 40 comprises a magnetic core member 41 having inductively disposed thereon a load winding 42 and a reset winding 45. The saturable reactor 50 comprises a magnetic core member 51 having inductively disposed thereon a load winding 52 and a reset winding 55.

The load windings 42 and 52 of the saturable reactors 40 and 50, respectively, have a common terminal 70. The load winding 42 of the saturable reactor 40, a rectifier 43 and a rectifier 44 are connected in series circuit relationship between the terminal 70 and a terminal 71. The load winding 52 of the saturable reactor 50, the rectifier 53 and a rectifier 54 are also connected in series circuit relationship between the terminals 70 and 71. A load 80 is to be connected across the rectifiers 44 and 54.

The reset windings 45 and 55 of the saturable reactors 40 and 50, respectively, have a common terminal 61. The reset winding 45 of the saturable reactor 40, a rectifier 46 and a rectifier 47 are connected in series circuit relationship between the terminal 61 and a terminal 60. The reset winding 55 of the saturable reactor 50, a rectifier 56 and a rectifier 57 are connected in series circuit relationship between the terminals 61 and 60.

An alternating current voltage source $E_2$ is connected through a resistor 121 to a primary winding 101 of a transformer 100. A saturable reactor 110 is connected across the primary winding 101 of the transformer 100. A secondary winding 102 of the transformer 100 supplies a gating voltage $E_G$ to the terminals 70 and 71. A secondary winding 103 of the transformer 100 supplies a reset voltage $E_R$ to the terminals 60 and 61.

The stages I and II are coupled by a constant current source 90 which is connected across the rectifiers 47 and 57 between the terminals 93 and 94 of the stage II magnetic amplifier. The constant current source 90 comprises a suitable direct current source 91 in series with a resistor 92. The terminals 93 and 94 also connect the constant current source 90 across the rectifiers 34 and 24 of the stage I magnetic amplifier.

The operation of the bridge-type magnetic amplifier of stage I is well-known to those skilled in the art but will be outlined briefly here. On the first half-cycle of the alternating current voltage $E_1$ the terminal 25 is at a positive polarity with respect to the terminal 35. Current will flow from the terminal 25 through the rectifier 36 in the forward direction, the output winding 32 of the saturable reactor 30, the constant current source 90 and the rectifier 24 in the forward direction to the terminal 35. On the next half-cycle of the alternating current voltage source $E_1$ the terminal 35 will be at a positive polarity with respect to the terminal 25. Current will flow from the terminal 35 through the rectifier 34 in the forward direction, the constant current source 90, the ouput winding 22 of the saturable reactor 20 and the rectifier 26 in the forward direction to the terminal 25. The magnitude of the voltage $E_1$ is sufficient to drive the reactors 30 and 50 just to positive saturation on the alternate half-cycles. Therefore, after the first two half-cycles, an output $E_C$ will appear at the terminals 93 and 94. When an input signal voltage with polarity as shown in Fig. 1 is applied to the terminals 10 and 11 current will flow from the terminal 10 through the control winding 33 of the saturable reactor 30 and the control winding 23 of the saturable reactor 20 to the terminal 11. The ampere-turns supplied by this input signal voltage will drive the reactors 20 and 30 away from positive saturation. The magnitude of this input signal voltage determines the magnitude of the output of stage I which appears as $E_c$ at the terminals 93 and 94.

The operation of the stage II volt-second controlled bridge magnetic amplifier is also well-known to those skilled in the art but will be described in brief here. The polarities shown for the gating voltage $E_G$ and the reset voltages $E_R$ in Fig. 1 are like instantaneous polarities. That is, when the terminal 70 is at a positive polarity with respect to the terminal 71, the terminal 60 is at a positive polarity with respect to the terminal 61. On the half-cycle of the above polarities current will flow from the terminal 70 through the load winding 42 of the saturable reactor 40, the rectifier 43 in the forward direction, the load 80 and the rectifier 54 in the forward direction to the terminal 71. On this same half-cycle current will also flow from the terminal 60 through the rectifier 47 in the forward direction, the constant current source 90, the rectifier 56 in the forward direction and the reset winding 55 of the saturable reactor 50 to the terminal 61.

On the next half-cycle, the terminal 71 is at a positive polarity with respect to the terminal 70 and the terminal 61 is at a positive polarity with respect to the terminal 60. Current will flow from the terminal 71 through the rectifier 44 in the forward direction, the load 80, the rectifier 53 in the forward direction and the load winding 52 of the saturable reactor 50 to the terminal 70. Current will flow from the terminal 61 through the reset winding 45 of the saturable reactor 40, the rectifier 46 in the forward direction, the constant current source 90 and the rectifier 57 in the forward direction to the terminal 60.

The gating voltage $E_G$ and the reset voltage $E_R$ supply sufficient ampere-turns to drive the reactors 40 and 50 just to positive saturation and just to negative saturation, respectively, on alternate half-cycles. Therefore, there will be no output from the stage II magnetic amplifier to the load 80 until a voltage is applied to the terminals 93 and 94 which reduces the amount of current from the reset voltage $E_R$ thereby reducing the amount of resetting ampere-turns applied to the reactors 40 and 50.

Figure 2:
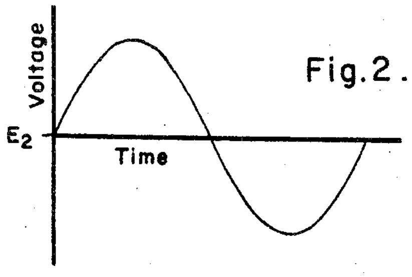
Fig. 2 is a graphical representation of wave forms present at selected points of Fig. 1.
Figure 3:
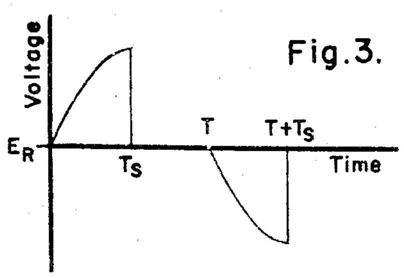
Fig. 3 is a graphical representation of wave forms present at other selected points of Fig. 1.

The alternating current voltage $E_2$ must have sufficient magnitude to saturate the saturable reactor 110 during a half-cycle. Upon saturation the saturable reactor 110 presents virtually zero impedance thereby shunting the primary winding 101 of the transformer 100. The voltages $E_G$ and $E_R$ will be zero for the remainder of the half-cycle. Assume that the parameters are such that the saturable reactor 110 saturates at the time $T_s$ during a half-cycle of 180°. Then the reset voltage $E_R$ would have a conduction angle of less than 180° and would appear as graphically represented in Fig. 3, assuming that the voltage $E_2$ is sinusoidal as shown in Fig. 2. In order to drive the stage II amplifier the output voltage $E_c$ at the terminals 93 and 98 from the stage I magnetic amplifier must meet two conditions. First, the voltage $E_C$ must have sufficient magnitude to overcome the reset voltage $E_R$ at the terminals 93 and 94, blocking the rectifiers 46 and 47. Secondly, if the voltage $E_C$ has met the first condition, then the firing angle of the voltage $E_C$ must occur before $T_s$ in order that it may control the output voltage of the stage II magnetic amplifier to the load 80.

Figure 4:
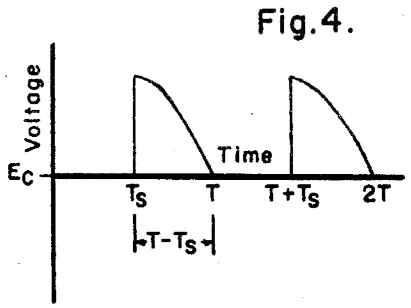
Fig. 4 is a graphical representation of wave forms present at still other selected points of Fig. 1.

As hereinbefore described the firing angle of the voltage $E_C$ is controlled by the magnitude of the input signal voltage as applied to the control circuit for the stage I magnetic amplifier connected to the terminals 10 and 11. As may be seen from Fig. 3 and Fig. 4, the stage II magnetic amplifier will not respond to the voltage $E_C$ until the firing angle of the voltage $E_C$ becomes greater than $(T-T_s)$. Then the firing angle of the voltage $E_C$ controls the reset flux of the stage II magnetic amplifier by reducing the effect of the reset voltage $E_R$ and hence will control the output voltage of the stage II magnetic amplifier to the load 80. With the gain of the stage I or "input" magnetic amplifier remaining constant, the gain of the two stage magnetic amplifiers can be varied by varying the firing angle $T_s$ of the voltage $E_C$. In other words, only a portion of the output voltage $E_C$ of the "input" amplifier is used to completely control the stage II or "output" magnetic amplifier. The portion of the voltage $E_C$ used to drive stage II is determined by the angle $T_s$.

It should be noted that the voltages $E_1$ and $E_2$ are of the same frequency but are not necessarily of the same phase. Also, it may be noted that any type of pulsed wave-shape for the voltages $E_R$ and $E_G$ is permissible, that is $E_R$ and $E_G$ do not necessarily have to be portions of sine waves, they merely have to be instantaneous in phase. The wave shape of the voltage $E_C$ should be similar over a given time to the voltages $E_R$ in order to obtain linearity in the output to the load 80. However, the magnetic amplifier circuit illustrated in Fig. 1 will work without this condition provided that the two above imposed conditions for the voltage $E_C$ are met.

In conclusion, it is pointed out that while the illustrated example constitutes a practical embodiment of my invention, I do not limit myself to the exact details shown, since modifications of the same may be varied without departing from the spirit of this invention.

I claim as my invention:

1. In a magnetic amplifier circuit, in combination, a first stage magnetic amplifier, a second stage magnetic amplifier, coupling means connecting the output of said first stage magnetic amplifier to control said second stage magnetic amplifier, said first stage magnetic amplifier comprising saturable means having inductively disposed thereon output winding means and control winding means, means for applying an alternating current voltage to said output winding means, means for applying an input signal voltage to said control winding means, said second stage magnetic amplifier comprising a saturable magnetic core having load winding means and reset winding means inductively disposed thereon, means for applying an alternating current voltage having a conduction angle of less than 180° per half-cycle to said second stage load and said second stage reset winding means, said alternating current voltage being applied to said second stage load and second stage reset winding means being operative to drive said second stage saturable magnetic core toward saturation on a gating half-cycle and away from saturation on a succeeding resetting half-cycle.

2. In a magnetic amplifier circuit, in combination, a first stage magnetic amplifier, a second stage magnetic amplifier, coupling means connecting the output of said first stage magnetic amplifier to control said second stage magnetic amplifier, said first stage magnetic amplifier comprising saturable means having inductively disposed thereon output winding means and control winding means, means for applying an alternating current voltage to said output winding means, means for applying an input signal voltage to said control winding means, said second stage magnetic amplifier comprising a saturable magnetic core having load winding means and reset winding means inductively disposed thereon, means for applying an alternating current voltage having a conduction angle of less than 180° per half-cycle to said second stage load and said second stage reset winding means, said alternating current voltage being applied to said second stage load and second stage reset winding means being operative to drive said second stage saturable magnetic core toward saturation on a gating half-cycle and away from saturation on a succeeding resetting half-cycle, said coupling means being operative to allow the output of said first stage magnetic amplifier to reduce the effectiveness of the said resetting half-cycle of said second stage magnetic amplifier.

3. In a magnetic amplifier circuit, in combination, a first stage magnetic amplifier, a second stage magnetic amplifier, coupling means connecting the output of said first stage magnetic amplifier to control said second stage magnetic amplifier, said first stage magnetic amplifier comprising saturable means having inductively disposed thereon output winding means and control winding means, means for applying an alternating current voltage to said output winding means, means for applying an input signal voltage to said control winding means, said second stage magnetic amplifier comprising a saturable magnetic core having load winding means and reset winding means inductively disposed thereon, transformer means having a saturable reactor connected across a primary winding of said transformer means for applying an alternating current voltage to said second stage load and said second stage reset windings, said alternating current voltage being applied to said second stage load and second stage reset winding means being operative to drive said second stage saturable magnetic core toward saturation on a gating half-cycle and away from saturation on a succeeding resetting half-cycle, said coupling means being operative to allow the output of said first stage magnetic amplifier to reduce the effectiveness of the said resetting half-cycle of said second stage magnetic amplifier.

4. In a magnetic amplifier circuit, in combination, a first stage magnetic amplifier, a second stage magnetic amplifier, coupling means connecting the output of said first stage magnetic amplifier to control said second stage magnetic amplifier, said first stage magnetic amplifier comprising saturable means having inductively disposed thereon output winding means and control winding means, means for applying an alternating current voltage to said output winding means, means for applying an input signal voltage to said control winding means, said second stage magnetic amplifier comprising a saturable magnetic core having load winding means and reset winding means inductively disposed thereon, transformer means having a saturable reactor connected across a primary winding of said transformer means for applying an alternating current voltage to said second stage load and said second stage reset windings, said alternating current voltage being applied to said second stage load and second stage reset winding means being operative to drive said saturable magnetic core toward saturation on a gating half-cycle and away from saturation on a succeeding resetting half-cycle, said coupling means comprising a constant current source connected across the output of said first stage magnetic amplifier and the input of said second stage magnetic amplifier.

5. In a magnetic amplifier circuit, in combination, a first stage magnetic amplifier, a second stage magnetic amplifier and coupling means connecting said first stage and said second stage magnetic amplifiers, said first stage magnetic amplifier comprising saturable means having inductively disposed thereon output winding means and control winding means, means for applying an alternating current voltage to said output winding means and means for applying an input signal voltage to said control winding means, said second stage magnetic amplifier comprising a pair of saturable magnetic cores, each said saturable magnetic core having a load winding and a reset winding inductively disposed thereon, means for connecting an alternating current voltage having a conduction angle of less than 180° per half-cycle between a common terminal and the uncommon terminals of said second stage load windings, means for connecting an alternating current voltage having a conduction angle of less than 180° per half-cycle between a common terminal and the uncommon terminals of said second stage reset windings, each said second stage saturable magnetic cores being alternately driven toward and away from positive saturation by current flow in said second stage load and second stage reset windings.

6. In a magnetic amplifier circuit, in combination, a first stage magnetic amplifier, a second stage magnetic amplifier and coupling means connecting said first stage and said second stage magnetic amplifiers, said first stage magnetic amplifier comprising saturable means having inductively disposed thereon output winding means and control winding means, means for applying an alternating current voltage to said output winding means and means for applying an input signal voltage to said control winding means, said second stage magnetic amplifier comprising a pair of saturable magnetic cores, each said saturable magnetic core having a load winding and a reset winding inductively disposed thereon, means for connecting an alternating current voltage having a conduction angle of less than 180° per half-cycle between a common terminal and the uncommon terminals of said second stage load windings, unidirectional current means poled to permit said pair of second stage saturable magnetic cores to be alternately driven toward positive saturation, means for connecting an alternating current voltage having a conduction angle of less than 180° per half-cycle between a common terminal and the uncommon terminal of said second stage reset windings, and unidirectional current means serially connected with said second stage reset windings and poled to permit said pair of second stage saturable magnetic core to be alternately driven away from positive saturation.

7. In a magnetic amplifier circuit, in combination, a first stage magnetic amplifier, a second stage magnetic amplifier and coupling means connecting said first stage and said second stage magnetic amplifiers, said first stage magnetic amplifier comprising saturable means having inductively disposed thereon output winding means and control winding means, means for applying an alternating current voltage to said output winding means and means for applying an input signal voltage to said control winding means, said second stage magnetic amplifier comprising a pair of saturable magnetic cores, each said saturable magnetic core having a load winding and a reset winding inductively disposed thereon, means for connecting an alternating current voltage having a conduction angle of less than 180° per half-cycle between a common terminal and the uncommon terminals of said second stage load windings, unidirectional current means poled to permit said pair of second stage saturable magnetic cores to be alternately driven toward positive saturation, means for connecting an alternating current voltage having a conduction angle of less than 180° per half-cycle between a common terminal and the uncommon terminals of said second stage reset windings, unidirectional current means serially connected with said second stage reset windings and poled to permit said pair of second stage saturable magnetic cores to be alternately driven away from positive saturation, said coupling means comprising a constant current source connected across the output of said first stage and the input of said second stage.

No references cited.